Patented Jan. 11, 1938

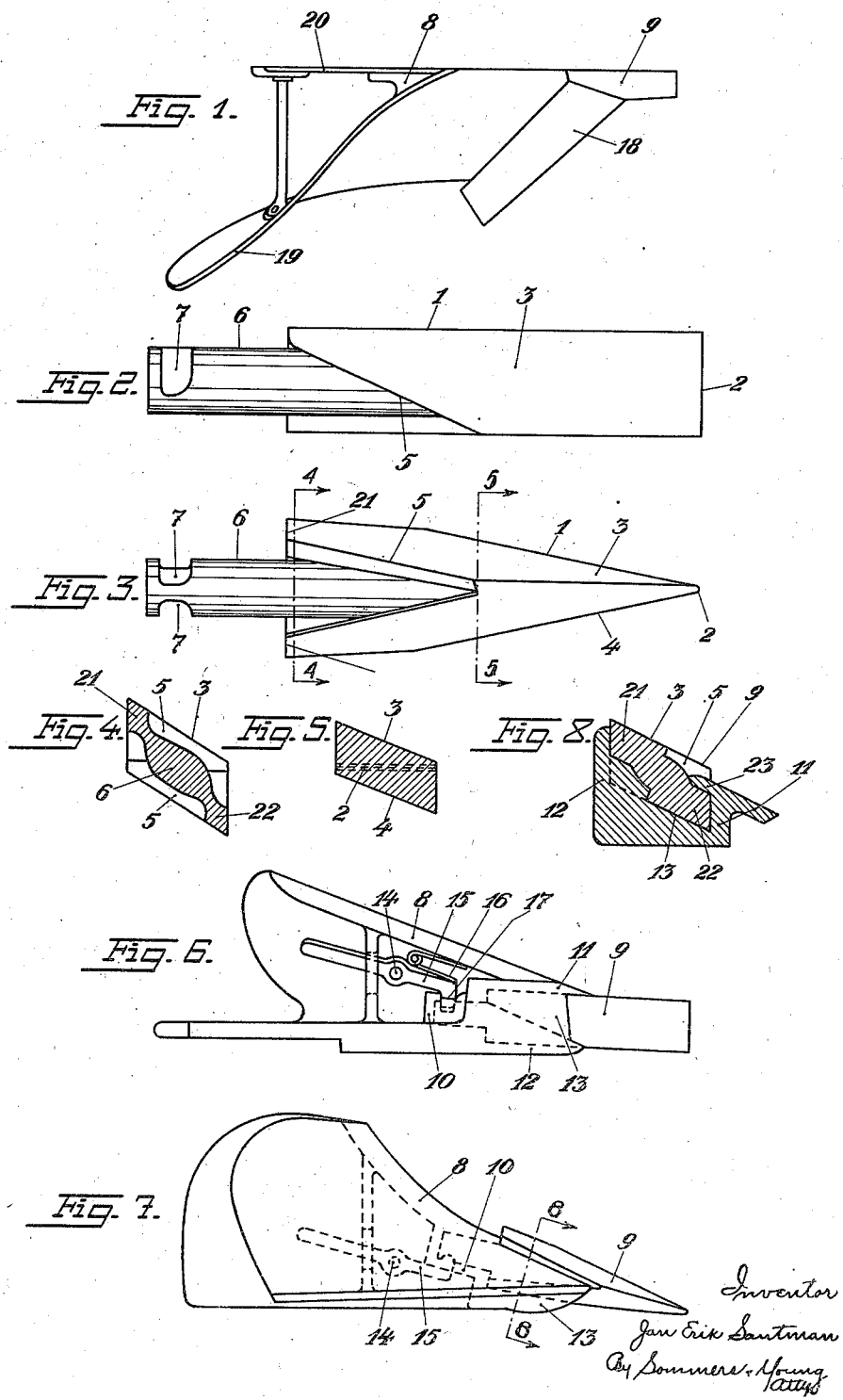

2,105,162

UNITED STATES PATENT OFFICE 2,105,162

PLOW

Jan Erik Santman, Overum, Sweden

Application December 1, 1936, Serial No. 113,656
In Sweden May 23, 1935

2 Claims. (Cl. 97—125)

The present invention relates to plows having a detachable share point, which is mounted together with other working parts such as share plate, mould board and landside on a common plow frame. In plows of this kind hitherto in general use the share points have been provided with a pair of rearwardly extending shanks having a small space between them, which have been adapted to enter into corresponding sockets in the plow frame, these sockets being separated by a thin wall and being substantially open upwards and downwards respectively. The foremost portion of the plow frame will thus be substantially bifurcated, the two halves being connected transversely of the plow merely by the thin wall separating the sockets, which wall will, consequently, have to stand most of the vertical stresses to which the share point is subjected. As the share point, being also bifurcated, is without any outer support along two sides the plow frame and also the share point are liable to be broken by excessive stresses, particularly as the material in the separating wall above referred to is often weakened as a result of contraction occurring in connection with the cooling of the cast material.

The invention has for its object a substantial improvement in the construction of the share point and the corresponding socket therefor with a view to eliminating the inconveniences mentioned, and is substantially characterized by the fact that the share point is wedge-shaped with its wedge-surfaces cut off obliquely at the rear end to conform in known manner to the share plate and is provided with a single rearwardly extending shank, and that the plow frame is formed into a trough-shaped socket, into which the share point enters in such a manner that the rear portion thereof is guided from all sides and that the lower wedge-surface of the share point is to a considerable extent covered by the bottom of the trough-shaped socket. The socket may be partly closed by a wall opposite the bottom, such wall being adapted to contact against a portion of the share point, which is countersunk in such manner as to place the remaining wedge-surface of the share point on the same level as the upper surface of the plow share. The rear portion of the socket is preferably tubular in shape and adapted to fit snugly around the shank of the share point. Preferably the plow point proper is symmetrical with respect to its longitudinal axis and is formed at its rear portion with two diagonally positioned rear end surfaces, between which the rearwardly extending shank is arranged centrally.

By the invention the inconvenience is eliminated that such portions of the plow frame as are intended to support the share point are liable to be weakened on account of contraction in the casting procedure. Further it is possible, in a convenient manner, to make strong enough those portions which are subjected to stresses from the share point, without rendering the plow frame and the share point excessively heavy and expensive.

A specific embodiment of the invention is illustrated in the accompanying drawing, in which Fig. 1 is a top plan view of a plow frame with affixed wearing parts and Figs. 2 and 3 a share point in top and lateral view respectively. Fig. 4 is a cross-section along the line 4—4 and Fig. 3 a cross-section along the line 5—5 in Fig. 3. Fig. 6 is a bottom view of a plow frame with only the share point affixed and Fig. 7 a lateral view of the same plow frame and share point. Fig. 8 shows a cross-section along the line 8—8 in Fig. 7.

In the drawing 1 is the wedge-shaped portion of the share point which terminates at its front end in a horizontal edge 2. The sides 3, 4 of the wedge-shaped portion, extending rearwardly from the edge 2, are slightly twisted and are cut off obliquely at the rear end at 5 to conform to the share plate. Thus two wing-shaped portions 21, 22 are formed, the rear end surfaces of which are adapted to rest against abutments formed in the plow frame. A shank 6 of flat oval cross-section extends backwards from the wedge-shaped portion and is provided with notches 7 to lock the share point in its position. The whole share point is symmetrical with respect to its longitudinal axis so as to allow it to be placed into the socket with either of the wedge-surfaces 3 and 4 turned upwards.

In the plow frame 8 is inserted a share point 9 constructed according to the invention, and on the frame 8 are further mounted (in Fig. 1) the share plate 18, the mould board 19 and the landside 20. The foremost portion of the frame is provided with a substantially trough-shaped socket (Figs. 6–8) constituted by the bottom 13 and the sidewalls 11, 12. Integral with the side wall 11 is a wall portion 23 opposite the bottom 13, this wall portion 23 being adapted to cover the wing-shaped portion 22 of the share point so as to provide complete guiding for the share point. The trough-shaped socket is continued rearwards by a tube-shaped and completely closed portion 10, which serves to support the shank 6 still more firmly. The share point is locked in position by means of a hook 15 pivoted on a pin 14, the said hook 15 being held in locking position by means of a spring 16. The hook passes through a hole 17 in the wall of the sleeve-like portion 10 of the socket and engages one of the notches 7 of the shank 6.

It is preferable to make the socket deep enough to enclose from the underside more than half of the length of the share point, thus producing an extremely rigid construction, which will stand the stresses connected with the use in a motor plow.

Various modifications are possible without departing from the scope of the invention.

I claim:—

1. A plow comprising a plow frame, a detachable share point, and a share plate, said share point being substantially wedge-shaped and having a rearwardly extending central shank, the wedge-surfaces of said share point being cut off obliquely at the rear end to conform to said share plate, and said plow frame forming a trough-shaped socket, the bottom of said trough-shaped socket enclosing a substantial portion of the lower wedge-surface of the share point.

2. A plow comprising a plow frame, a detachable share point, and a share plate, said share point being substantially wedge-shaped and being formed with a countersunk portion, and having a rearwardly extending central shank, the wedge-surfaces of said share point being cut off obliquely at the rear end to conform to said share plate, and said plow frame forming a trough-shaped socket, the bottom of said trough-shaped socket enclosing a substantial portion of the lower wedge-surface of the share point, said socket being partly covered by a top wall opposite the bottom, and said top wall engaging the countersunk portion of the share point.

JAN ERIK SANTMAN.